(12) United States Patent
Carlsson et al.

(10) Patent No.: US 7,100,647 B2
(45) Date of Patent: Sep. 5, 2006

(54) FORESTRY MACHINE

(75) Inventors: Jan Carlsson, Vittaryd (SE); Christer Lennartsson, Vislanda (SE)

(73) Assignee: Fiberpac KB, Vittaryd (SE)

( * ) Notice: Subject to any disclaimer, the term of this patent is extended or adjusted under 35 U.S.C. 154(b) by 67 days.

(21) Appl. No.: 10/783,211

(22) Filed: Feb. 20, 2004

(65) Prior Publication Data

US 2004/0240977 A1 Dec. 2, 2004

Related U.S. Application Data

(63) Continuation-in-part of application No. PCT/SE02/01448, filed on Aug. 12, 2002.

(51) Int. Cl.
*A01G 23/08* (2006.01)

(52) U.S. Cl. .................. 144/4.1; 144/335; 144/356

(58) Field of Classification Search ............... 144/382, 144/356, 430, 335, 4.1, 367, 3.1, 34.1, 24.13, 144/34.2, 338, 340, 343; 250/223 R, 559.25
See application file for complete search history.

(56) References Cited

U.S. PATENT DOCUMENTS

| | | | | |
|---|---|---|---|---|
| 3,972,357 A | * | 8/1976 | Neal et al. .................. | 144/4.1 |
| 4,537,362 A | * | 8/1985 | Zuloaga ................ | 241/101.742 |
| 5,193,597 A | * | 3/1993 | Strong ..................... | 144/208.7 |
| 5,366,337 A | | 11/1994 | Eriksson | |
| 5,579,816 A | * | 12/1996 | Hill et al. .................... | 144/4.1 |
| 6,182,725 B1 | * | 2/2001 | Sorvik ......................... | 144/335 |
| 6,408,906 B1 | * | 6/2002 | Moon et al. ............. | 144/24.13 |
| 6,779,570 B1 | * | 8/2004 | Tardif ......................... | 144/4.1 |

FOREIGN PATENT DOCUMENTS

| | | |
|---|---|---|
| DE | 3536459 | 5/1986 |
| DE | 3628767 | 3/1988 |
| WO | 8704128 | 7/1987 |
| WO | 9608959 | 3/1996 |

\* cited by examiner

*Primary Examiner*—Bena Miller
(74) *Attorney, Agent, or Firm*—Bachman & LaPointe

(57) ABSTRACT

A forestry machine with devices for felling, trimming and cutting trees includes a control system with operating devices which are actuable by an operator. The operating devices control the felling, trimming and cutting devices, as well as the movements of the forestry machine. The operating devices are disposed discrete and separate from the forestry machine so that the working environment of the operator is free of the turnings, jolts and vibrations which the forestry machine is subjected to during operation. Preferably, the operator and the operating devices are placed in a load-carrying vehicle on which the forestry machine loads the felled trees. A system for forest felling includes a felling unit and an operating module. The operating module is disposed discrete and separate from the felling unit. Preferably, the operating module is disposed in a load-carrying vehicle which receives felled trees from the felling unit.

16 Claims, 2 Drawing Sheets

FORESTRY MACHINE

CROSS REFERENCE TO RELATED APPLICATION

This application is a Continuation-In-Part of copending PCT International Application No. PCT/SE02/01448, filed Aug. 12, 2002.

TECHNICAL FIELD

The present invention relates to a forestry machine with devices for felling, trimming and cutting trees, comprising a control system which has operating means actuable by an operator for controlling the felling, trimming and cutting devices, as well as the movements of the forestry machine proper, the operating means being disposed discrete and separate from the forestry machine.

The present invention further relates to a system for felling, comprising a felling unit and an operating module, the operating module being disposed discrete and separate from the felling unit.

BACKGROUND

For some years, modern forestry has been developing towards an increasingly higher degree of mechanisation. For working duties where chain saws were previously used, "two stage grip" forestry machines began to be employed in the 1970s, which entailed that the manual handling of trees and timber declined. Such forestry machines are characterised by having a gripping device which grasps the tree to be felled already in connection with the felling operation. Thereafter, the tree is grasped once more and moved to a trimming unit, preferably on the same forestry machine. This treatment thus takes place in two stages, and in daily parlance this type of machine is therefore known as a "two stage gripper".

During the 1990s, the forestry machines were even further refined and made more efficient, and forestry machines which grasp the tree to be felled, carry out the felling operation, and also trim and cut the tree in one and the same operation were introduced. This type of forestry machine is called in daily parlance a "single stage gripper", since the tree is grasped only once. This younger generation of forestry machines is not only more rapid and more efficient but also lighter. The earlier "two stage grippers" had a weight of between 20 and 30 tonnes, while the new machines weigh only 15 to 20 tonnes. Both types of machines run on inflatable rubber wheels which have a large springing ability.

Since the tree which is cut and handled has a considerable mass, this results in pronounced swaying and jolts in the forestry machine when the tree bends or is moved at all by the machine. In addition to these movements, there are also movements which are the result of the uneven terrain, and also vibrations from engines, hydraulic systems, fans, pumps and the like. Taken as a whole, these movements result in an extremely unpleasant and unsuitable working environment for the operator controlling the machine.

The operators are afflicted by numerous problems as a result of the constant turnings and movements of the forestry machine, for example nausea, headaches, fatigue and loss of concentration. Since the operators must constantly parry these often random movements, problems also occur in muscular tension. In the long term, the poor working environment has resulted in wear and tear on the operators, in the skeleton, joints and muscles, and the risk of sickness absenteeism and early retirement is high.

The movements of the forestry machines are even so pronounced that the operators fend off to parry such movements and at worst to such a degree that the operating devices are subjected to extreme stresses and run the risk of being snapped off. While safety belts are mounted in most forestry machines, they are experienced by the operators as impractical and inconvenient and, as a result, are seldom worn.

In certain cases, downright dangerous situations may occur such as in the cutting of wind-felled trees. Such trees are occasionally trapped under other trees and can powerfully spring back on being cut and cause serious personal injury as well as damage to equipment.

In addition to the human suffering, there are also economic aspects to this problem. When the operators are afflicted by the above-mentioned problems, their productivity is reduced, among other things because of difficulties in concentrating and fatigue. The need for breaks increases far beyond that which is normal for the average in working life. The risk of faulty judgement and negligence also increases, which may involve additional costs for scrapped machinery. Even more serious is that such faulty judgement and negligence may lead to injury to human beings and also to costly repairs to equipment. Reduced productivity may even take such expression that operators are disinclined to move themselves and their forestry machines more than is necessary, with the result that, among other things, felled trees lie scattered about in the terrain and efficient transport is impeded. Moreover, the transport vehicles increase the wear stresses on the land.

The above-outlined problems have increased because of a growingly unfavourable relationship between the mass of the felled tree trunks and the mass of the machine. At the same time as the machines have become lighter and quicker, development has also moved towards higher awareness in matters relating to the working environment and, in addition, there are now stricter demands on comfort than before.

One conceivable attempt to solve this problem could be to provide the forestry machine with collapsible stabiliser feet, but, on the one hand, the protraction and retraction of such feet takes far too long a time and, on the other hand, the terrain is seldom flat enough and firm enough for such feet to be usable.

A further problem inherent in existing forestry machines is visibility. Granted, the cab of the operator is in an elevated position and an overview of the units of the machine is quite good, but one result of the elevated placing of the cab is that it is difficult to see the surrounding terrain, and objects which are located in the vicinity immediately close to the forestry machine. Another problem concerning visibility is that the terrain and surrounding trees constitute restrictions in the choice of the position of the forestry machine. This may entail that the operator is forced to work looking into the sunlight, which partly affects safety and partly increases fatigue and the discomfort as described above.

The noise level in forestry machines is generally quite high and fatiguing in the long term. Moreover, this affects concentration, with resultant problems, and also increases the risk of damage to hearing. Granted, some form of hearing protection can be employed, but they are seldom used in practice, since they are experienced by the operator as an obstacle to his work.

In order to reduce turning movements, jolts and vibrations, various types of suspension devices for the operator's driving seat have been worked on. A few examples of devices employed are hydraulic dampers, friction dampers and compensation with the aid of electronic transducers. Unfortunately, the results have not come up to expectation, partly because the damping does not function adequately, and partly because, even if the seat is kept relatively still, the surrounding cab will move, which entails that problems in travel sickness, fatigue and difficulties in concentrating will be more or less the same as before.

Another attempted solution is to apply the same type of damping and suspension to the cab as a whole, but, on the one hand the damping is insufficient, and, on the other hand, the rest of the machine will continue to move, for which reason the above-outlined problems of travel sickness and fatigue remain unsolved.

Hence, the above problems together combine to form an extremely unsuitable working environment and attempts have been made to come to grips with at least a part of these problems. However, at worst the solutions may counteract each other. An elevated cab which, to some degree improves visibility, has the disadvantage that it entails even more pronounced pivotal movements for the operator when the forestry machine is driven in certain types of terrain.

As was mentioned above, safety belts to restrain the operator and reduce muscular tension are seldom used since they are experienced as being impractical and inconvenient.

SUMMARY OF THE INVENTION

The object of the present invention is to realise a considerably improved working environment for the operator as regards principally undesired movements and noise.

The object forming the basis of the present invention will be attained if the forestry machine intimated by way of introduction is given the characterising feature that the operator and the operating means are placed on a load-carrying vehicle on which the forestry machine loads the felled trees.

Regarding the system, the object of the present invention will be attained if this is characterised in that the operating module is disposed in a load-carrying vehicle which receives felled trees from the felling unit.

Further advantages will be attained if the present invention is given any of the further characterising features as set forth in appended claims 2 to 4 and 6 to 8, respectively.

DETAILED DESCRIPTION OF THE PREFERRED EMBODIMENT(S)

Figure 1:
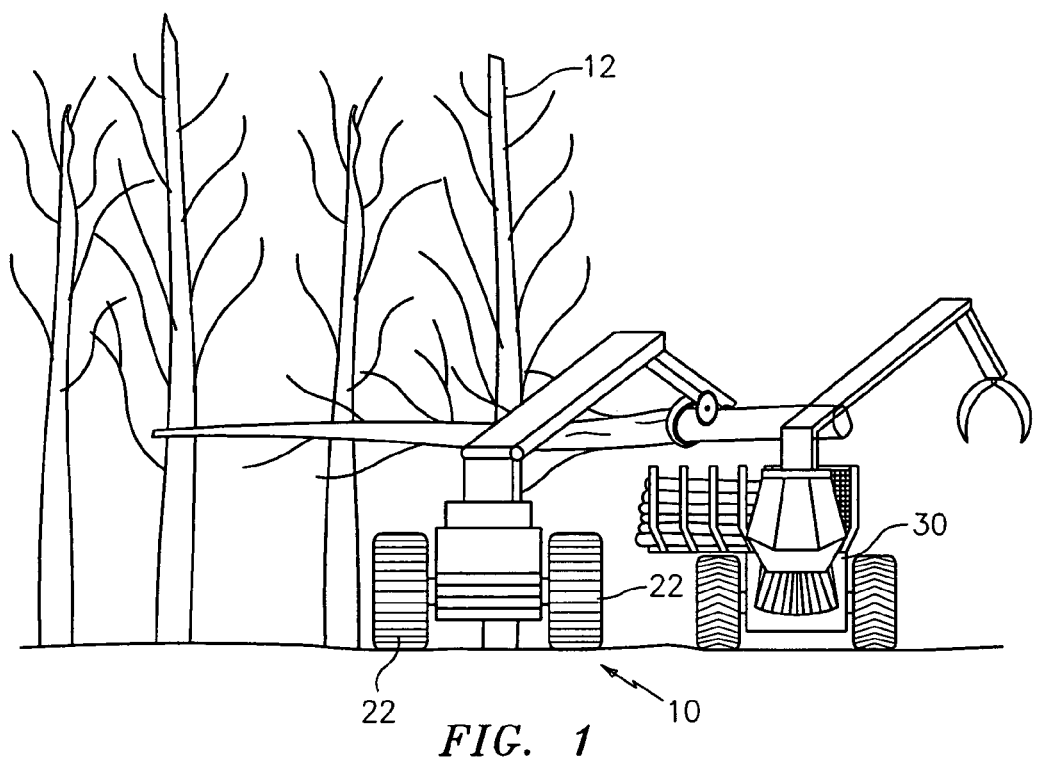
FIG. 1 is a front view of a forestry machine in accordance with the present invention.
Figure 2:
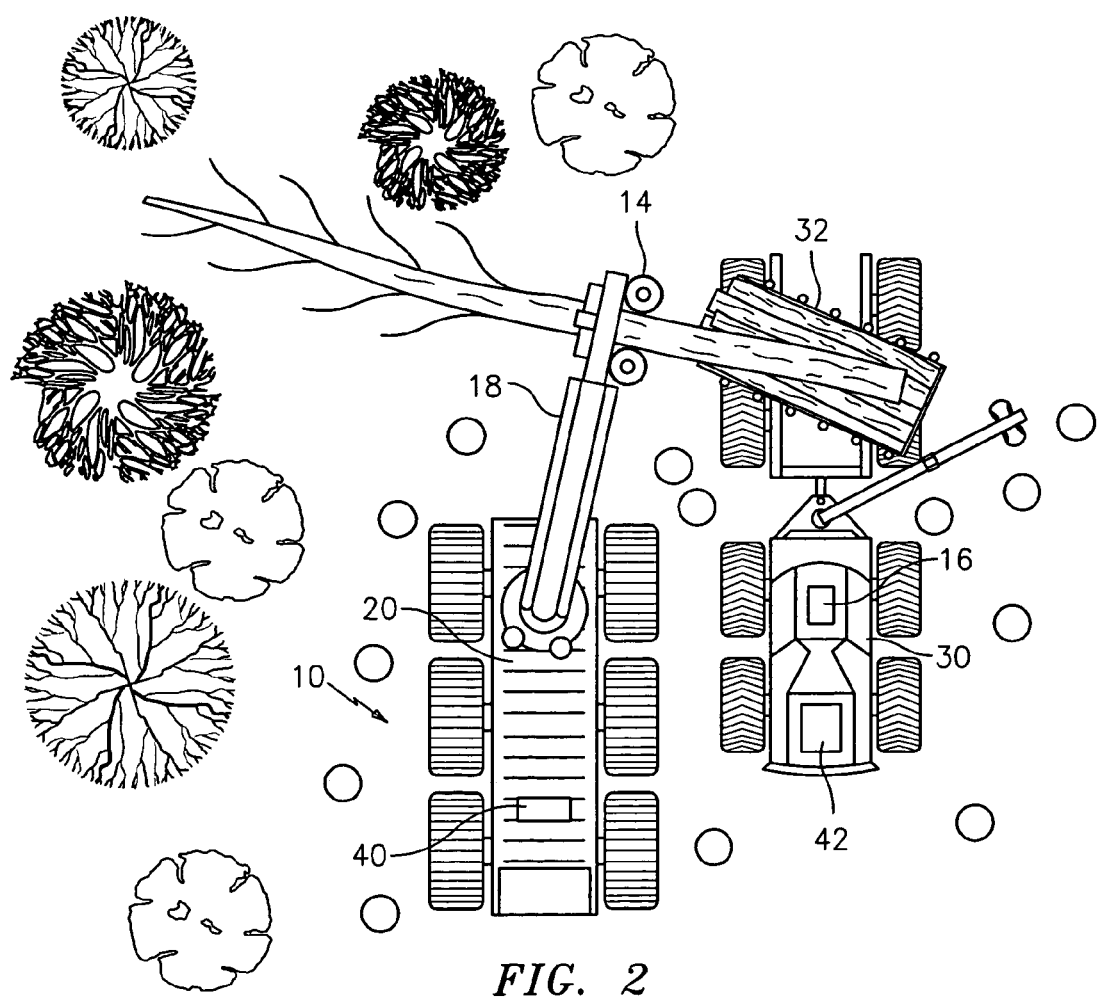
FIG. 2 is a top view of the forestry machine of FIG. 1.
Figure 3:
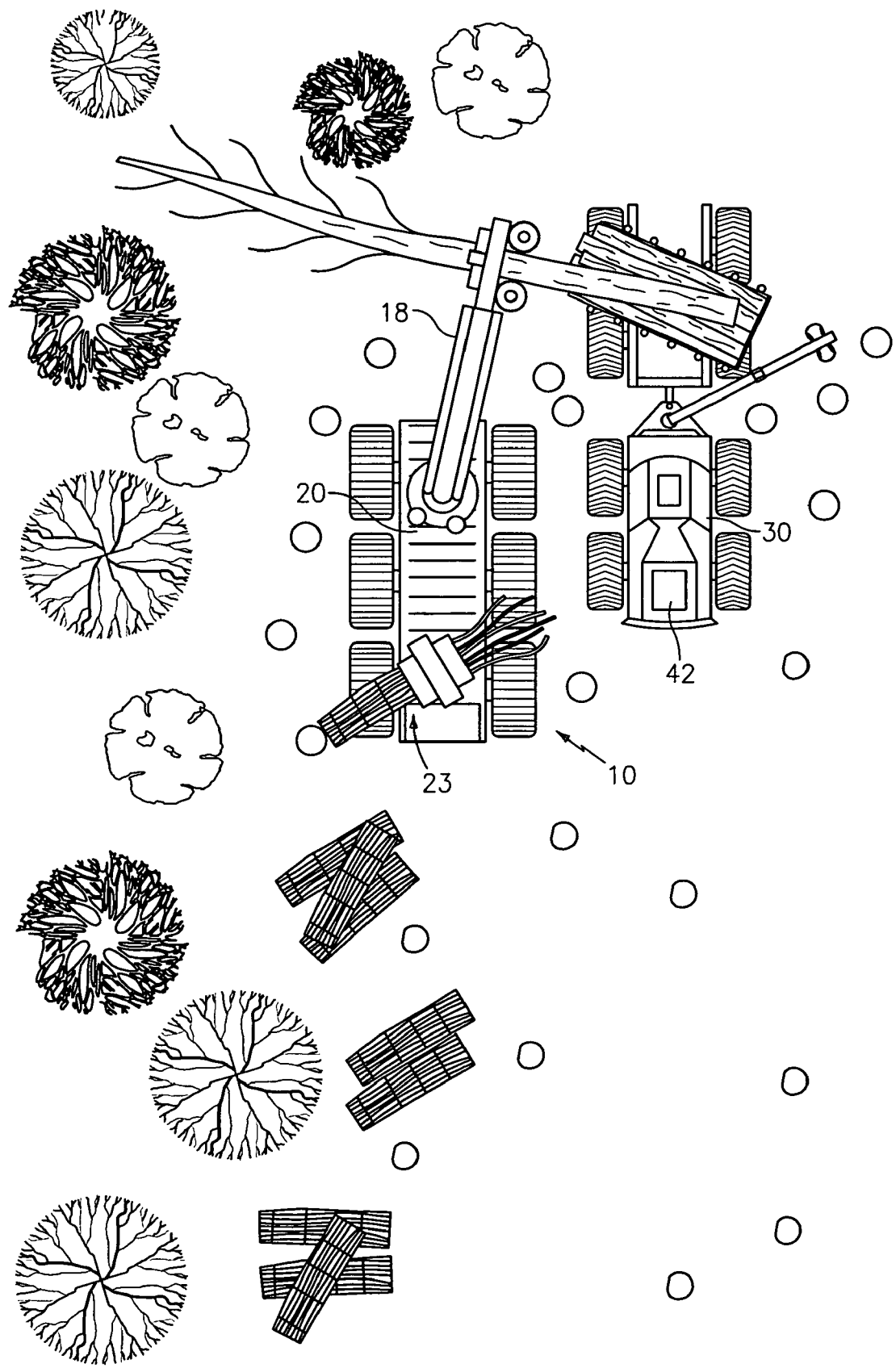
FIG. 3 is another top view of the forestry machine of FIG. 1.

Referring now to the drawings, the invention relates to a forestry machine 10 for the felling and further processing of trees 12. In addition to the felling unit 14, preferably in the form of a saw device, there are additional means for processing the felled tree trunk. Normally, this is a matter of trimming devices and devices for cutting the felled tree trunk into manageable lengths. The various devices on the forestry machine are generally powered hydraulically and controlled by means of electronic control signals from computers or electric circuits. Unlike the prior art forestry machines, the forestry machine 10 according to the present invention does not have any cab for the operator.

The devices that are placed on the forestry machine 10 receive their control signals from an operating means 16. The operating means 16 is, unlike the prior art forestry machines, separate and discrete from, and preferably placed a distance from the forestry machine 10. Thus, the operator need not be himself on or in the vicinity of the forestry machine. As a result, the working environment for the operator can be considerably improved.

As was intimated above, the forestry machine 10 according to the present invention includes certain devices and units which are previously known in the art. Typically, this type of forestry machine 10 is articulated so that a rear half 18 and a front half 20 are movable in relation to one another and can assume an angle in relation to one another. The wheels 22 of the machine 10 are inflatable rubber wheels and the suspension of the wheels 22 is such that a levelling out of the forestry machine can be achieved. Normally, the forestry machine 10 is four-wheel drive, even though driving on fewer or more wheels may also occur. Possibly, the wheels 22 of the machine may also be provided with chains or the like for increased terrain access.

As was mentioned above, in the forestry machine 10 according to the present invention, there is no cab for the operator on the vehicle. The forestry machine 10 can then be lower, which entails several advantages. For example, it is easier for the forestry machine 10 to pass under low depending tree branches, the risk of collision with power lines is reduced and a person placed a distance from the forestry machine finds it easier to look over the machine. The fact that the forestry machine 10 according to the present invention does not have a cab for the operator also entails that space on the vehicle is made available, and it is possible to utilise this space for other per se known assemblies and units, such as bundlers or devices for ground scarification. The presence of bundlers 23 is particularly advantageous since a so-called "total felling" or clearance may more simply be put into effect. Branchwood, branches and similar waste which is to be bundled, possibly for recycling, spends but a short time on the ground and will thereby be less susceptible to pollution. Finally, the absence of a cab also entails that the point of gravity of the forestry machine is displaced downwards and its stability is thereby improved.

The operating means 16 which is placed discrete and separate from the forestry machine comprises a preferred panel with levers primarily of the joystick type. The panel may also be provided with contactors and other regulators for the engagement and disengagement of various functions. With the aid of the regulators on the panel, control signals are generated for controlling the movements of the forestry machine and movements in its different devices. The control signals can be transmitted to the forestry machine 10 in various ways. One possibility is that the signals are transmitted via a cable. This variation is principally usable in short range operation between the operator and the forestry machine 10 another alternative is a wireless transmission of the control signals. This variation is particularly advantageous when the distance between the operator and the forestry machine is great and when the terrain and vegetation between the place where the operator is located and the place where the forestry machine is working are unsuitable for a cable. The wireless transmission may be put into effect using various types of techniques, but preferably using such techniques as are employed for the wireless transmission of data between computers and peripheral equipment.

All functions in the forestry machine 10 with its various devices are controllable from the remote control panel 16. In the preferred embodiment, the control of all functions of the forestry machine 10 is gathered in a single computer, which entails that the operating means may be made as simple as possible.

As was mentioned previously, the operator, together with the operating means 16 in the form of a control panel, is a distance away from the forestry machine 10. If the weather is pleasant, the operator can at discretion be out in the open terrain. However, in many cases it is better if the operator is housed in an accompanying vehicle 30 which can move in forest terrain and be stationary during work. The environment in the vehicle 30 may be optimised, for example by heating appliances or air conditioning and the seat in which the operator sits can be of maximum ergonomic design. The major difference in relation to prior art technology, where the operator was placed in a driver's cab on the forestry machine, is that turning, rocking, jolts and vibrations from the forestry machine are wholly eliminated from the operator's working environment. The reaction forces which are generated by the trees which are felled do not at all affect the vehicle in which the operator is located. The operator can control the forestry machine 10 so that felled and cut timber is placed in optimum positions at the felling site, which simplifies transport, and also minimises wear stresses on the vegetation from the transport vehicles. Naturally, it is necessary that the accompanying vehicle 30 move at regular intervals, but not at all to the extent to which the forestry machine 10 proper moves while work is in progress.

It is particularly advantageous if the accompanying vehicle 30 at the same time acts as a transport vehicle, a so-called forwarder. In such instance, the tree-felling forestry machine 10 is controllable so that it loads felled and cut timber directly on the forwarder. It is especially advantageous if the load area 32 of the forwarder, i.e. its load-carrying platform, is pivotal so that its direction can be adapted to correspond to the forestry machine 10 and the direction of the newly-felled timber. As a result, loading onto the forwarder 30 is considerably simplified. By such means, a separate (and often time-consuming) working phase for loading the forwarder is thereby avoided. Previously, this working phase could take up to 25% of the total working time when the felled trunks must be collected and loaded separately. Since only one lifting operation takes place, fuel will also be saved. Moreover, timber quality will be improved if the cut timber is gathered up directly without waiting time for collection. Only a minor quantity of chemicals need be added to fresh pulp wood on pulp production, compared with such pulp wood as has lain on the ground for up to a month before being transported away. This in turn gives an improved environment and lower costs.

Another advantage, in particular in timber which is to be sawn into boards is that the presence of foreign matter such as stones, gravel, and humus on the end surfaces of the timber is reduced, which in turn improves timber quality and reduces the risk of damage to saw blades and other equipment in the sawmill.

If desired, it is possible to provide each forestry machine 10 according to the present invention with two or more forwarders 30 which take turns to receive felled timber and transport the timber to the closest public road in shuttle traffic.

In this instance, a host computer 40 is suitably provided in the forestry machine 10, while a so-called "administration unit" 42 is disposed in each forwarder 30. When one forwarder 30 is fully loaded and the next forwarder 30 is to take its place, computer files are transferred from the administration unit on the new forwarder to the host computer in the forestry machine so that all values in the host computer are zeroised and no unexpected movements are carried out. Possibly, the replacement and zeroisation can take place by means of a regulator in the forwarder, for example in its driver's seat.

Production data can advantageously be stored in the host computer 40 or respectively in the administration units 42. Each forwarder 30 will then have its own production report in which the quantity of felled timber which the relevant forwarder has transported can be read-off, the dimensions of the timber, prices etc. At the same time as the timber is felled by the forestry machine 10, data is transferred to the administration unit 42 of the forwarder and the production report is continuously updated. The advantage will hereby be afforded that it is possible to obtain an extremely accurate overview of the quantity of timber which has been transported by the forwarder and which is now available at a public road.

The host computer 40 is also rehearsed so that it is automatically zeroised when it loses power. When the power returns, the forestry machine 10 will therefore remain immobile until the necessary computer files have once again been fed into the host computer from the nearest forwarder.

The noise level to which the operator was previously exposed in the forestry machine is drastically reduced in the accompanying vehicle. Among other things, the effects from such noise as is generated on the processing of the felled trees, noise from fans, noise from hydraulic systems and pumps, as well as engine noise which occurs in the constant ongoing movements of the forestry machine are all reduced. Per se it is possible that these noises may be audible from the place of the operator in the accompanying vehicle, but since the volume of noise fades by the square root of the distance from its source, the noise level is considerably lower.

A further advantage inherent in the forestry machine according to the present invention is that the operator can seek out the optimum position for monitoring the forestry machine. This implies not least that positions where the operator is obliged to work into the sunlight, can, to a very degree, be avoided.

Finally, the forestry machine and the forestry felling system according to the present invention enjoy the advantage that the operator will have a more alternating occupation, which in itself reduces the risk of repetitive strain injuries. The operator works, on the one hand, with harvesting, in other words, manages the forestry machine, and, on the other hand, with the transport of the felled timber. The two working duties are carried out at intervals and give the operator more change than was previously possible. The alternation in work will become a natural part of work and will, therefore, not be neglected.

To sum up, major advantages will be attained in the operator's working environment and the problems described by way of introduction relating to travel sickness, fatigue and difficulties in concentration can be as good as totally obviated. The operator is capable of working more efficiently and with a higher level of concentration, which gives a higher productivity output level and improved safety awareness. Moreover, the human advantages are considerable, as the risk of stress, wear and other occupational injuries is reduced considerably. Finally, as was mentioned above, it is possible to improve the logistics in transporting off the felled trees, which is profitable and entails reduced stress and wear on the land and vegetation.

The present invention may be modified without departing from the scope of the appended claims.

What is claimed is:

1. A forestry machine comprising:
a movable vehicle;
means for felling, cutting, and trimming trees attached to said movable vehicle;
means for operating said felling, cutting, and trimming means and for controlling movement of said vehicle; and
said operating means comprising a computer positioned on said vehicle for receiving operating instructions from a remote location and for issuing commands to said tree felling, cutting, and trimming means and said vehicle in response to said operating instructions.

2. The forestry machine according to claim 1, wherein said vehicle is cab-free.

3. The forestry machine according to claim 1, wherein said computer is configured to receive operating instructions from multiple sources.

4. The forestry machine according to claim 1, further comprising means for bundling branchwood, branches and waste disposed on said vehicle.

5. The forestry machine according to claim 1, wherein said vehicle has a front half and a second half which are movable with respect to each other.

6. The forestry machine according to claim 1, wherein said vehicle has inflatable rubber wheels and a suspension for the wheels which allows said vehicle to be leveled.

7. The forestry machine according to claim 1, wherein said computer comprises a host computer having means for storing production data.

8. The forestry machine according to claim 1, wherein said computer is configured to be zeroed when power to the computer is lost.

9. A system for forestry felling comprising:
a forestry machine having a tree felling unit;
at least one vehicle onto which felled trees are placed;
remote means for operating said forestry machine and said felling unit, said remote means being positioned at a distance from said forestry machine; and
said forestry machine having onboard means for receiving operating instructions from said remote means and for operating said forestry machine and said tree felling unit in response to said operating instructions.

10. The system according to claim 9, wherein said remote operating means and an operator are located on said at least one vehicle.

11. The system according to claim 10, wherein said operator is housed in said at least one vehicle.

12. The system according to claim 9, further comprising two vehicles onto which felled trees are placed and each of said vehicles having said remote operating means and an operator.

13. The system according to claim 12, wherein said operating means on a first of said vehicles instructs said forestry machine to place felled trees on said first of said vehicles until said first of said vehicles is fully loaded and then said operating means on a second of said vehicles instructs said forestry machine to place felled trees on said second of said vehicles.

14. The system according to claim 9, wherein said forestry machine includes a device for bundling branchwood, branches and waste.

15. The system according to claim 9, wherein said receiving means further comprises means for transmitting data to said remote operating means.

16. The system according to claim 9, wherein said at least one vehicle comprises at least one transport vehicle.

* * * * *